United States Patent [19]
Fujikawa

[11] Patent Number: 5,401,216
[45] Date of Patent: Mar. 28, 1995

[54] BELT TIGHTENING DEVICE

[75] Inventor: Masaru Fujikawa, Osaka Sayama, Japan

[73] Assignee: Elephant Clain Block Company Limited, Osaka, Japan

[21] Appl. No.: 86,098

[22] Filed: Jul. 6, 1993

[30] Foreign Application Priority Data

Jul. 24, 1992 [JP] Japan .................................. 4-198610
Mar. 9, 1993 [JP] Japan .................................. 5-047935

[51] Int. Cl.[6] ............................................. F16H 7/22
[52] U.S. Cl. ...................................... 474/130; 474/273
[58] Field of Search ...................... 474/101, 130, 273; 410/103; 254/264

[56] References Cited

U.S. PATENT DOCUMENTS

| | | |
|---|---|---|
| 2,997,761 | 8/1961 | Davis . |
| 3,668,743 | 6/1972 | Roberts . |
| 3,910,558 | 10/1975 | Brucker et al. ................... 254/164 |
| 4,054,267 | 10/1977 | Berg et al. ........................ 254/164 |
| 4,199,182 | 4/1980 | Sunesson . |
| 4,432,689 | 2/1984 | Shell ................................. 414/416 |

FOREIGN PATENT DOCUMENTS

| | | |
|---|---|---|
| 0399726 | 11/1990 | European Pat. Off. . |
| 2407097 | 5/1979 | France . |
| 2556421 | 6/1985 | France . |
| 2059321 | 5/1971 | Germany . |
| 2150166 | 12/1990 | Japan . |

*Primary Examiner*—Ramon S. Britts
*Assistant Examiner*—Roger J. Schoeppel
*Attorney, Agent, or Firm*—Stevens, Davis, Miller & Mosher

[57] ABSTRACT

A belt tightening device, wherein a basic end of a first belt located at one lengthwise side of the belt tightening device is fixed to a windup shaft driven by operating an operating lever, a wind-in member and a fixed rod are provided at the other lengthwise side of the same, and a belt length adjusting mechanism is provided which adjusts a length of a second belt located at the other lengthwise side a main body of the belt tightening device and can fix the second belt in the position where the length has been adjusted.

8 Claims, 10 Drawing Sheets

BELT TIGHTENING DEVICE

FIELD OF THE INVENTION

The present invention relates to a belt tightening device, and more particularly to a belt tightening device provided at one side with a main body having a windup shaft rotatable to wind up a first belt, a second belt supported at the other side of the main body, and an operating lever supported to the windup shaft and for driving the same.

BACKGROUND OF THE INVENTION

Figure 16:
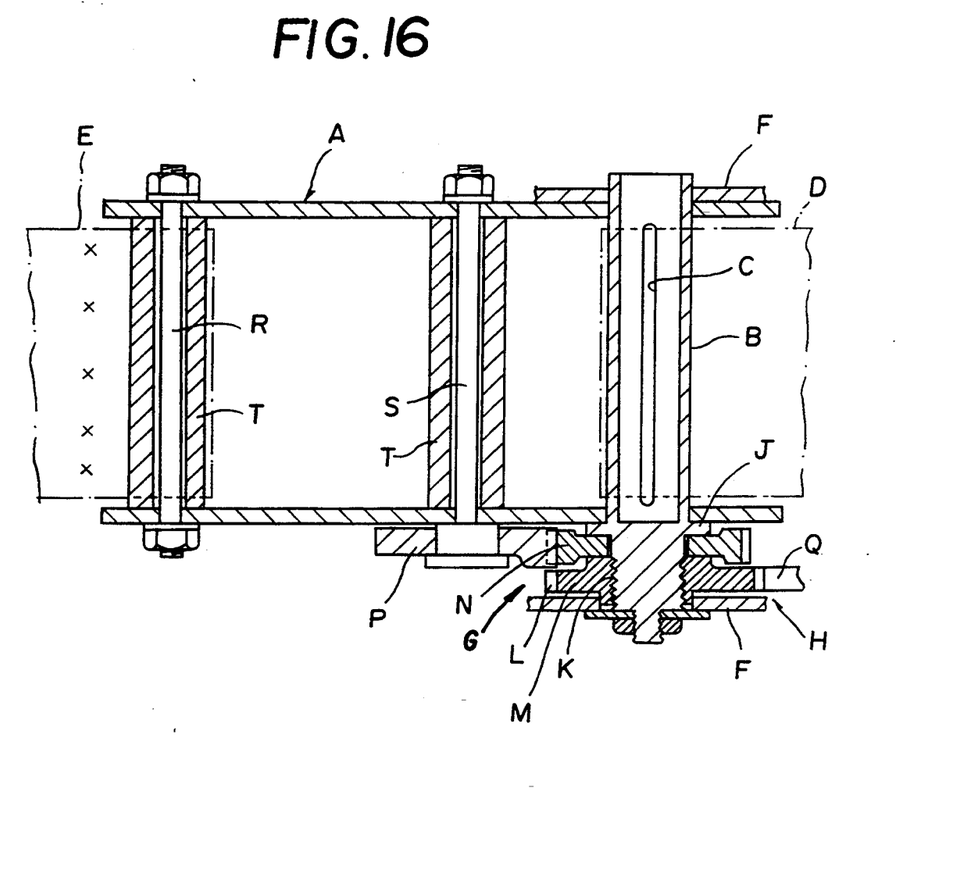
FIG. 16 is a sectional view of the conventional example.

The conventional belt tightening device has been proposed as disclosed in, for example, the Japanese utility Model Laid-Open Gazette No. Hei 2-150166, which is proposed by the applicant of the present invention and so constructed that, as shown in attached FIG. 16, a windup shaft B provided at one side of a main body A is provided with a belt insertion slit C, a free end of an adjusting belt D having at one end thereof a hook is inserted into the slit of the windup shaft B so as to be windable and adjustable in its belt length, a fixed belt E having a hook fixed at one end thereof and at its other end to the other side of the main body A through a fixed shaft R. An operating lever F is swingably supported to the windup shaft B, and between the operating lever F and the windup shaft B is provided with a transmission mechanism H having a mechanical brake G for transmitting the power caused by the swinging motion of operating lever F to the windup shaft B.

In addition, the mechanical brake G comprises a driven disc J integrally provided at the windup shaft B, a driving member M having a gear L screwable with a threaded shaft K, a braking ratchet wheel N interposed between the driving member M and the driven disc J, and an anti-reverse-rotation pawl P swingably supported to the main body A a pivotal shaft S and engageable or disengageable with or from the ratchet wheel N, the transmission mechanism H comprising the mechanical brake G and a transmitting pawl Q supported to the lever F and engageable or disengageable with or from the gear portion L. In addition, in FIG. 16, reference letter T designates a collar.

Accordingly, the operating lever F is moved in a swinging motion, so that the driving member M is normally rotated through a feed pawl at the transmitting pawl Q and screws forwardly through the rotation, the driving member M, driving ratchet wheel N and driven disc J, are integrated, the power transmitted to the driving member M is transmitted to the windup shaft B to be rotatably driven, the adjusting belt D inserted into the windup shaft B is wound up, and the adjusting belt D and fixed belt E are stretched, thereby belt-tightening cargo within the belt.

In the case where the cargoes are belt-tightened as above-mentioned, the hooks at the fixed belt E and adjusting belt D are held by retaining member or eyes at the load-carrying platform of, for example, a truck, and the free end of the adjusting belt D inserted into the slit C of windup shaft B is pulled by hand to keep the fixed belt E and adjusting belt D in a predetermined stretched state, thereby swinging the operating lever F. The adjusting belt D is wound up onto the windup shaft B by rotation thereof caused by the swinging motion of operating lever F, whereby the belts D and E are stretched to tighten the cargoes. In order to release the cargo tightening, a return pawl of the transmitting pawl Q is engaged with the gear portion L at the driving member M and the lever F is swung. The swinging motion of the lever F reversely rotates the driving member M, so that the driving member M screws backwardly in the direction of moving away from the driven disc J, whereby the driving member M, braking ratchet wheel N and driven disc J are released from integration thereof. Hence, the windup shaft B can reversely rotate only by an amount of backward screwing of the driving member M and the adjusting belt D wound up to the windup shaft B is rewound to enable the belts D and E to be loosened.

As the above-mentioned, since the adjusting side belt D is inserted into the slit C provided at the windup shaft B and overlapped with the free end of the adjusting belt D inserted into the slit C so as to be wound up onto the windup shaft B by rotation thereof, in other words, since the adjusting belt D is overlapped at the free end and at the tight side thereof and wound up double onto the windup shaft B, a windup radius of the belt D is enlarged with respect to a windup length thereof, and since the windup radius is limited by a collar T attached to the windup shaft B, a windup amount is restricted. Also, the adjusting belt D, which is only inserted into the slit C but not retained thereto, may escape at the free end from the slit C when the belt D is rewound more that the windup amount during the releasing the cargo tightening. Accordingly, a problem is created in that even if the cargoes are upset during the releasing the cargo tightening, such upset cannot be prevented.

When the rewinding is performed more than the windup amount or the anti-reverse-rotation pawl P disengages to release the baggage tightening at a single stroke even if the cargo is not upset, the free end of the adjusting belt D may escape from the slit C. Hence, when the tightening device is reused, it is troublesome that the free end of the adjusting belt D must be again inserted into the slit C.

SUMMARY OF THE INVENTION

An object of the present invention is to provide a belt tightening device for baggage, which restricts an increase in a windup radius with respect to a windup length of the belt onto the windup shaft, to obtain enough windup amount, fully stretches the belt, even when the belt is rewound more than the windup amount during the releasing the cargo tightening, the belt never escapes from the windup shaft B so as to enable the belt to be held with respect to the main body, upset of baggage is prevented, and troublesome work to mount the belt to the windup shaft is eliminated.

In order to attain the above-mentioned object, the present invention has been designed as follows: In addition, for quick understanding, explanation will be given on the belt tightening device for cargoes of the invention by use of reference numerals in the drawings showing an embodiment of the present invention. In detail, a fundamental characteristic of the present invention is that; in a belt tightening device for cargoes provided with a main body 1 of the tightening device, a first belt 5 disposed at one lengthwise side of the main body 1, a second belt 7 disposed at the other lengthwise side of the same, a windup shaft 6 for winding up the first belt 5, and an operating lever 10 supported to the windup shaft 6 and for driving the windup shaft 6; the basis end of the first belt 5 is fixed to the windup shaft 6, and at the other lengthwise side of the main body 1 is provided with a belt length adjusting mechanism 8 comprising; a wind-in member 9 having a circumferential surface for winding up the second belt 7 to a point halfway of the basic side and shiftable back and forth lengthwise of the main body 1 and a fixed rod 2 positioned in front of the wind-in member 9 and opposite thereto so as to fixedly sandwich the second belt 7 between the fixed rod 2 and the wind-in member 9, so that the second belt 7 is adjustable in length thereof and about stretched by the adjustment, thereby restricting an increase in windup radius of the first belt 5 with respect to a windup length thereof by the windup shaft 6 so as to enable the belt to be fully stretched.

In the above-mentioned construction, the wind-in member 9 may be not rotatable to the main body 1 and slidable back and forth lengthwise thereof, so that, when the second belt 7 is subjected at the load side to a tensile force, the wind-in member 9 may slide forwardly longitudinally of the main body 1 and the second belt 7 may be fixedly sandwiched between the wind-in member 9 and the fixed rod 2.

It is preferable that at the main body 1 there is provided a sliding groove 38 for supporting the wind-in member 9 so as to be not-rotatable and slidable back and forth lengthwise of the main body 1, the sliding groove 38 is provided with a first groove 38a positioned in front longitudinally of the main body 1, so that the fixed rod 2 and wind-in member 9 in the first groove 38a fixedly sandwich therebetween the second belt 7, and with a second groove 38b in continuation of the first groove 38a and positioned at the rear longitudinally of the main body 1 with respect to the first groove 38a and the wind-in member 9 moves away from the fixed rod 2 to release the second belt 7 from being sandwiched and to maintain this release.

Also, the wind-in member 9 is rotatably supported to the main body 1, and a cam 52 may be provided which, when the wind-in member 9 rotates by a tensile force applied to the load side of the second belt 7, fixedly clamps the second belt 7 between the wind-in member 9 and the fixedly rod 2.

It is preferable that forwardly and downwardly of the wind-in member 9 there is provided a wind-in compensation pin 41 which engages with the load side of the second belt 7 to be wound in the wind-in member 9 to thereby compensate a wind-in amount of the second belt 7 to the wind-in member 9.

It is also preferable that the wind-in member 9 is provided at at least one axial side thereof with an operating portion 9b for operating the wind-in member 9.

Also, at one axial end of the windup shaft 6 are provided a driven disc 13, a support portion 15 for a braking ratchet wheel 14, and a threaded shaft portion 17, the ratchet wheel 14 is supported to the support portion 15, a driving member 16 having a gear portion 16a engageable with a transmitting pawl 25 at the operating lever 10 is screwably mounted onto the threaded shaft portion 17, and a mechanical brake 11 supporting an anti-reverse-rotation pawl 3 engageable with the ratchet wheel 14 may be provided at the main body 1.

It is preferable that at both axial sides of the windup shaft 6 are provided a pair of driven discs 13, a pair of support portions 15 for supporting braking ratchet wheels 14, and a pair of threaded shaft portions 17; an operating lever 10 is formed of a pair of arms 10a and 10b, and a grip 10c for connecting the arms 10a and 10b, the braking ratchet wheels 14 are supported to the support portions 15 respectively; driving members 16 having gear portions 16a engageable with transmitting pawls 25 at the arms 10a and 10b are screwably mounted onto the threaded shaft portions 17 respectively, a pair of anti-reverse-rotation pawls 3 engageable with the ratchet wheels 14 are supported to the main body 1, and a pair of mechanical brakes 11 are provided at both the axial sides of the windup shaft 6.

The present invention of the above-mentioned construction can operate as follows: The basic end side of the first belt 5 wound up to the windup shaft 6 for belt-tightening the baggage is fixed to the windup shaft 6, the second belt 7 provided at the other side of the main body 1 is adapted to be adjustable in length by the belt length adjusting mechanism 8, and the windup shaft 6 winds up the belt for tightening the cargo. In other words, the present invention is not so designed as in the conventional example shown in FIG. 16, in which the second belt 7 is fixed, only the first belt 5 adjusts its length and is overlapped with the free end to be wound up onto the windup shaft for tightening the cargoes, whereby the first belt 5 can be wound up in one layer to the windup shaft 6. Accordingly, the cargoes are sufficiently tightened without an increase in the windup radius of the belt. In other words, during the tightening the cargoes the second belt 7 is adjusted in length to apply a predetermined tension to the belts 5 and 7 and moreover the basic end side of the first belt 5 is fixed to the windup shaft 6, whereby the operating lever 10 rotates the windup shaft 6 to reduce an amount of windup of the first belt 5 and to tighten the cargoes. Moreover, the windup radius can be restricted from its increase. Accordingly, sufficient tightening of cargoes is performable. Also, even when the first belt 5 is rewound more that the windup amount to the windup shaft 6 during the releasing the cargo tightening, since the first belt 5 is fixed to the windup shaft 6, there is no fear that the first belt 5 escapes from the slit at the windup shaft as in the conventional example. Also, since the second belt 7 is fixed by the belt length adjusting mechanism 8, in this stage, further upset of cargo can be prevented. Even when the cargoes are released from the tightening at a stroke, the first belt 5 never escapes from the windup shaft 6 and also the second belt 7 is held, thereby enabling the cargoes to be prevented from upset. Moreover, since the first belt 5 never escapes from the windup shaft 6, a troublesome work caused by the belt having escaped and again be inserted into the slit can be avoided.

In the case where the wind-in member 9 is supported to the main body 1 so as to be not rotatable but slidable back and forth lengthwise of the main body 1 and the second belt 7 is fixedly sandwiched between the wind-in member 9 and the fixed rod 2, when the second belt 7 is subjected at the load side to a tensile force, the wind-in member 9 moves toward the fixed rod 2 to diminish an internal space between the wind-in member 9 and the fixed rod 2 so that the second belt 7 can be fixedly sandwiched therebetween. The wind-in member 9 is operated to merely slide so that an interval between the wind-in member 9 and the fixed rod 2 can be widened to release the second belt 7 from being fixedly sandwiched, thereby enabling the second belt 7 to be easy to adjust in length.

In the case where the sliding groove 38 for slidably supporting the wind-in member 9 is formed of the first groove 38a and second groove 38b, the wind-in member 9 is slid toward the first groove 38a to diminish the interval between the wind-in member 9 and the fixed rod 2 to fixedly sandwich the second belt 7 therebetween, and the wind-in member 9 is slid from the first groove 38a to the second groove 38b so as to widen the interval between the wind-in member 9 and the fixed rod 2 so as to release the second belt 7 from being fixedly sandwiched, and moreover, even when the wind-in member 9 is released from slide operation, the above-mentioned open state can be maintained. In brief, there is no need of maintaining the release state by the wind-in member 9, whereby the second belt 7 can further be easy to adjust in length.

In the case where the wind-in member 9 is rotatably supported to the main body 1 and provided with a cam 52, when the load side of the second belt 7 is subjected to the tensile force, the wind-in member 9 can be rotated thereby and the interval between the cam 52 and the fixed rod 2 can be reduced to fixedly sandwich the second belt 7, whereby the second belt 7 can further strongly be fixedly sandwiched. Also, the wind-in member 9 is rotated in the reverse direction to the rotation direction by the load, whereby the interval between the cam 52 and the fixed rod 2 can be widened to release the second belt 7 from being fixedly sandwiched, thereby facilitating adjustment of length of second belt 7.

Figure 6:
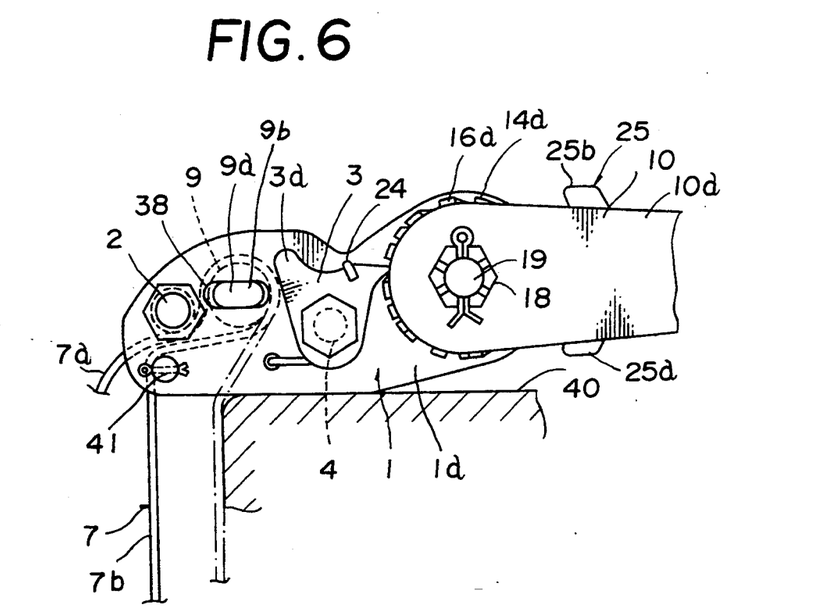
FIG. 6 is a partial side view explanatory of another example of usage and of operation of a wind-in compensation pin.

In the case that the compensation pin 41 is provided frontward and downwardly of the wind-in member 9 so that the load side 7b of the second belt 7 is tightened perpendicularly with respect to the first belt 5 for tightening the cargo, in other words, even when the main body 1 is positioned on the upper surface and at the corner of the cargo so that the second belt 7 is tightened at the load side thereof and at a right angle as shown in rig. 6, the pin 41 can compensate the fixedly sandwiching of the second belt 7 between the wind-in member 9 and the fixed rod 2, whereby the second belt 7 can be prevented from being not-fixable and can expand versatility of usage.

Furthermore, the wind-in member 9 is provided with an operating portion 9b, so that when the second belt 7 is released from being fixedly sandwiched and adjusted of length, the operation is easy to improve work efficiency to that extent.

Also, in the case where at one axial side of the windup shaft 6 there is provided the mechanical brake 11 provided with the driven disc 13, braking ratchet wheel 14, driving member 16 and anti-reverse-rotation pawl 3 so that power caused by operation of the operating lever 10 is transmitted to the wind-in member 9, when during the releasing the belt tightening by operating the operating lever 10, the windup shaft 6 can be rotated while the mechanical brake 11 is being operated, thereby preventing the cargoes from being released from belt-tightening at a stroke.

In the case where at both the axial sides of the windup shaft 6 there is provided the mechanical brakes 11 each provided with the driven disc 13, braking ratchet wheel 14, driving member 16 and anti-reverse-rotation pawl 3 and the operating lever 10 is formed of a pair of the arms 10a and 10b and the grip 10c, the cargo can be prevented from being released from the belt-tightening at a stroke, and moreover the power caused operation of the operating lever 10 can be transmitted to the windup shaft 6 from the grip 10c through the arms 10a and 10b and mechanical brakes 11 at both the axial ends of the windup shaft 6, so that, even when a load to be tightened is larger, the belt-tightening therefor can effectively be carried out without deforming the operating lever 10, whereby there is no need of especially improving the rigidity of operating lever 10.

These and other objects of the invention will become more apparent in the detailed description and examples which follow.

DETAILED DESCRIPTION OF THE INVENTION

Figure 1:
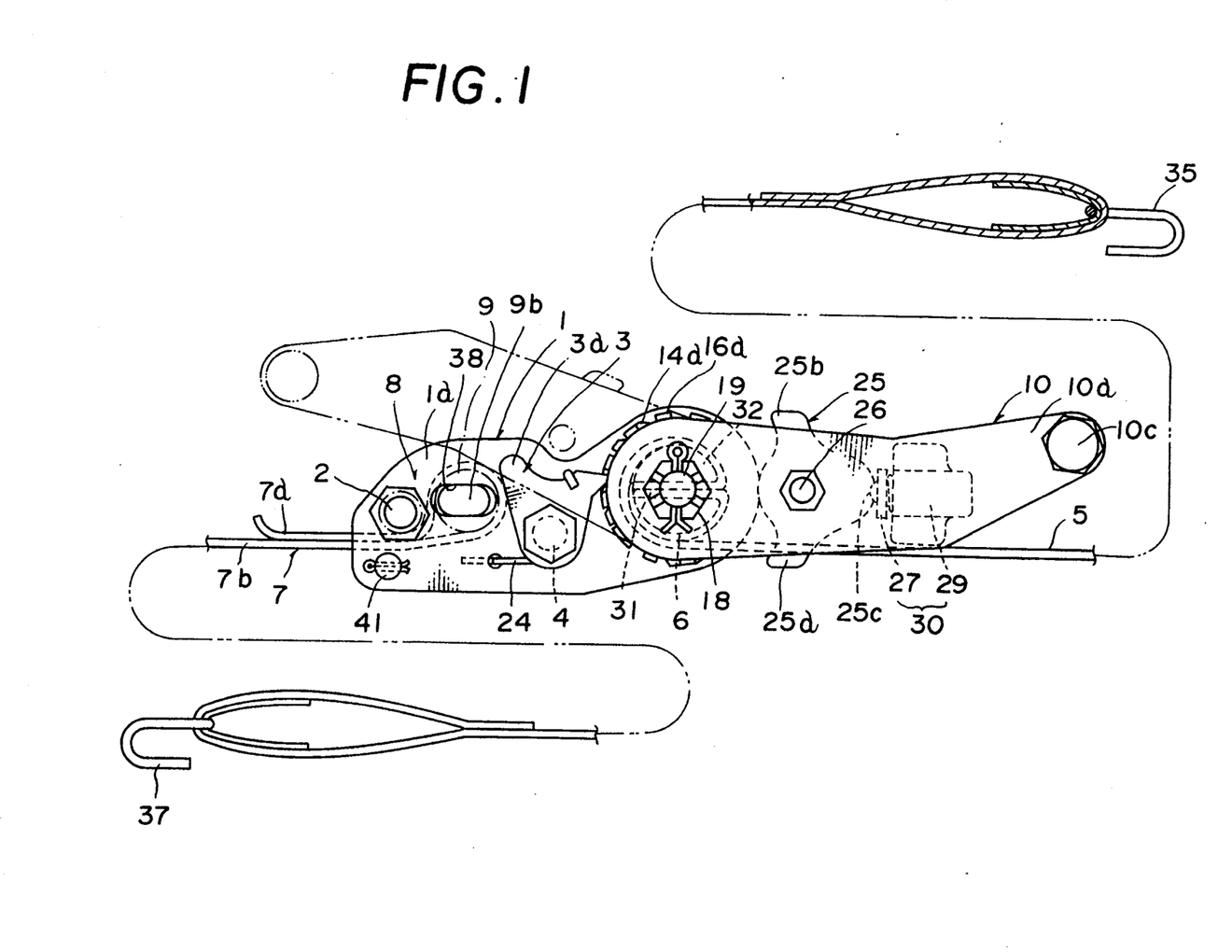
FIG. 1 is a side view of an embodiment of the belt tightening device of the present invention.
Figure 2:
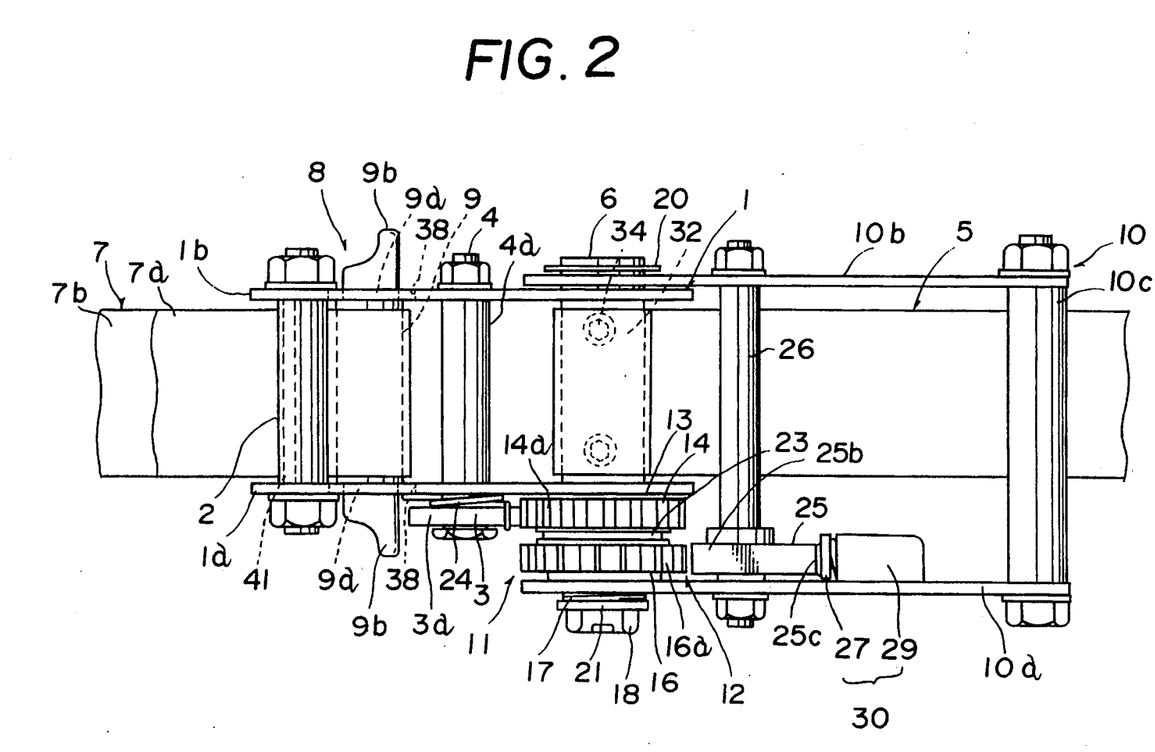
FIG. 2 is a plan view of the same.
Figure 3:
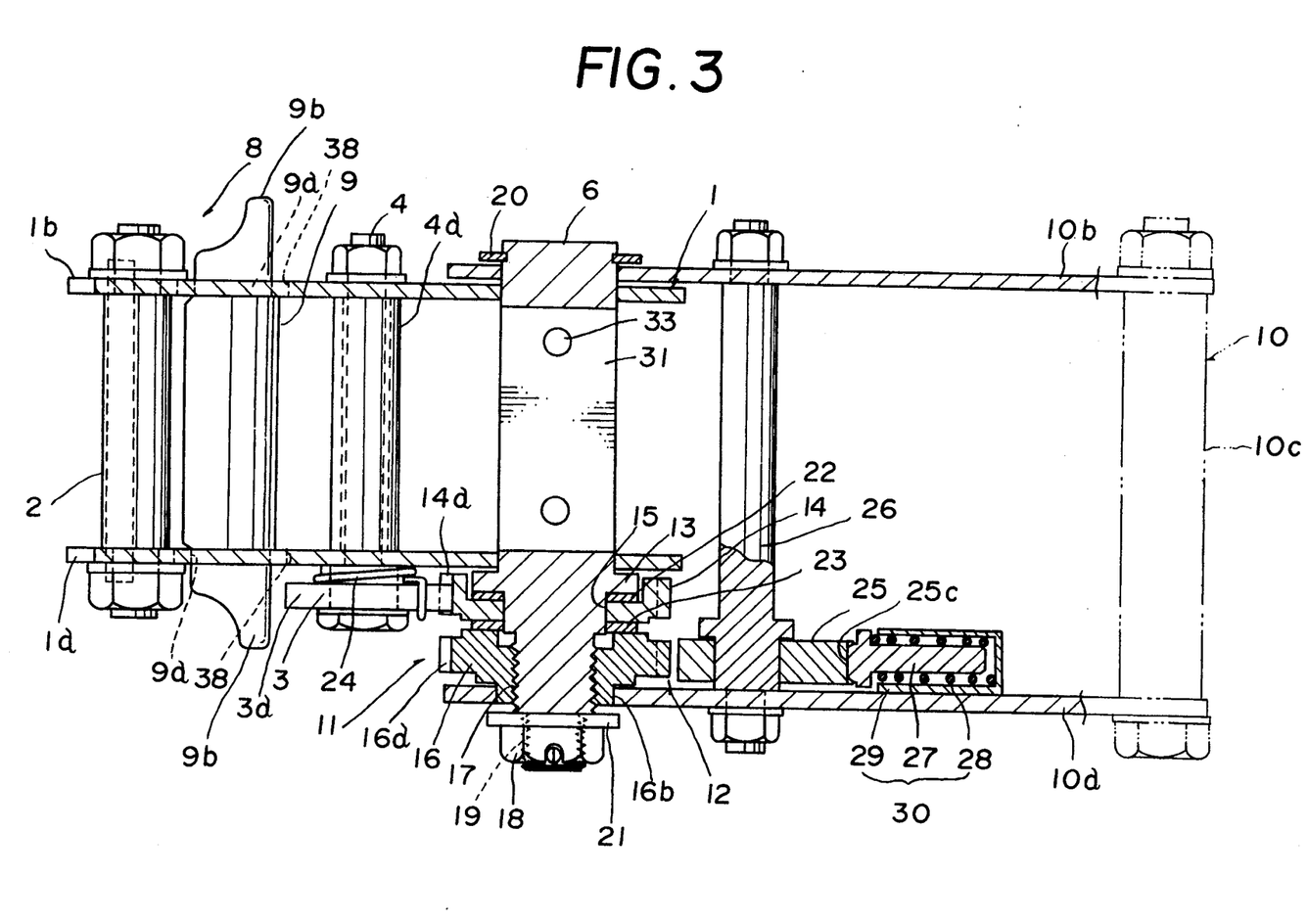
FIG. 3 is an enlarged sectional plan view of a windup shaft, a transmitting pawl and a position holding mechanism in part.

A belt tightening device shown in FIGS. 1 through 3 is based on a main body 1 of the belt tightening device of a frame-like shape which is provided with a pair of side plates 1a and 1b opposite to each other at a predetermined interval; the side plates 1a and 1b being connected by a fixed rod 2 to be discussed below and by a connecting shaft 4 used also as a pivot shaft for an anti-reverse-rotation pawl 3 and sleeved with a collar 4a; at one lengthwise side of the main body 1 is rotatably provided a windup shaft 6 for winding up a first belt 5; the first belt 5 is fixed to the windup shaft 6; at the other lengthwise side of the main body 1 is provided a wind-in member 9 of a belt-length adjusting mechanism 8 for fixing, together with the fixed rod 2, a second belt 7 in relation of being adjustable of its length; an operating lever 10 for driving the windup shaft 6 is supported thereto; and between the operating lever 10 and the windup shaft 6 is provided a transmission mechanism 12 having a mechanical brake 11.

The windup shaft 6 is rotatably supported to the main body 1,and as shown in FIGS. 2 and 3, projects at both axial ends outwardly from the side plates 1a and 1b, and the lever 10 is rotatably supported to the projecting shaft ends. At one of the projecting ends of the shaft 6 are provided a driven disc 13, a support portion 15 for a braking ratchet wheel 14, a threaded shaft portion 17 screwable with a driving member 16 having a gear portion at the outer periphery, and a small diameter threaded shaft portion 19 screwable with a nut 18, thereby constituting a mechanical brake 11.

The operating lever 10 comprises a pair of arms 10a and 10b and a grip 10c for connecting free ends thereof, one arm 10b of the lever 10 is rotatably supported to the projecting end portion of the windup shaft 6 and locked by a snap ring 20, the braking ratchet wheel 14 is rotatably supported to the support portion 15 of the projecting end of the windup shaft 6 projecting outwardly from the side plate 1a, the driving member 16 is screwably mounted onto the threaded shaft portion 17, at a boss 16b of the driving member 16 is rotatably supported the other arm 10a at the operating lever 10, and the nut 18 is screwed with the smaller diameter threaded shaft portion 19 so as to lock the driving member 16 and arm 10a through a washer 21.

Lining plates 22 and 23 are interposed between the driven disc 13 and the ratchet wheel 14 and between the ratchet wheel 14 and the driving member 16 respectively. The anti-reverse-rotation pawl 3 engageable or disengageable with or from the ratchet wheel 14 is provided at one axial end of the connecting shaft 4 coupled with the main body 1 and biased by a spring 24 to permanently engage with the ratchet teeth 14a at the ratchet wheel 14, and, as shown in FIG. 1, at the operating lever 10, a transmitting pawl 25, which has a feed pawl 25a and a return pawl 15b engageable or disengageable with or from the gear portion 16a at the driving member 16 and has a neutral position holding portion 25c at an intermediate portion between the pawls 25a and 15b is swingably provided through a pivot shaft 26.

At one arm 10a of the operating lever 10 is provided a position holding mechanism 30 comprising a pusher 27 engageable with the transmitting pawl 25, a spring 28, and a holding cylinder 29 for holding the pusher 27 and spring 28, so as to hold the transmitting pawl 25 in three positions of the neutral position where the pusher 27 engages with the neutral position holding portion 25a and both the pawls 25a and 25b do not engage with the gear portion 16a, the normal rotation position where the feed pawl 25a engages with the gear portion 16a, and the reverse rotation position where the return pawl 25b engages with the same.

In the above-mentioned construction, the driven disc 13, ratchet wheel 14, anti-reverse-rotation pawl 3, driving member 16, and lining plates 22 and 23, constitute the mechanical brake 11, and the mechanical brake 11 and transmitting pawl 25 constitute a transmission mechanism 12 for transmitting the power caused by swinging motion of the operating lever 10 to the windup shaft 6. The feed pawl 25a at the transmitting pawl 25 engages with the gear portion 16a, so that the operation lever 10 operates to normally rotate the windup shaft 6 in the direction of winding up the first belt 5. Also, the return pawl 25b of the same engages with the gear portion 16a, so that the operating lever 10 is operated to reversely rotate the windup shaft 6 in the direction of rewinding the first belt 5.

In addition, in the above-mentioned construction, between the washer 21 and the driving member 16 is provided a gap through which the driving member 16 can axially screwably move to a predetermined extent in the state where the nut 18 tightly screws with the windup shaft 6, whereby the driving member 16 axially moves through the gap to enable the mechanical brake 11 to operate or release its operation.

In the belt tightening device for cargoes of the present invention, the belt 5, as above-mentioned, is fixed to the windup shaft 6 and the second belt 7 can be fixed to be adjustable in its length by the belt length adjusting mechanism 8.

Next, explanation will be given on fixing construction of the first belt 5 to the windup shaft 6 and the belt length adjusting mechanism 8.

Figure 4:
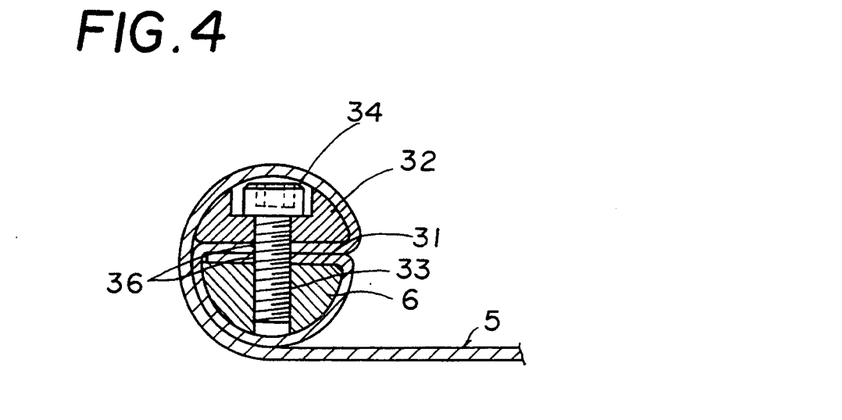
FIG. 4 is a longitudinally sectional view of a first belt is fixed to the windup shaft.
Figure 5:
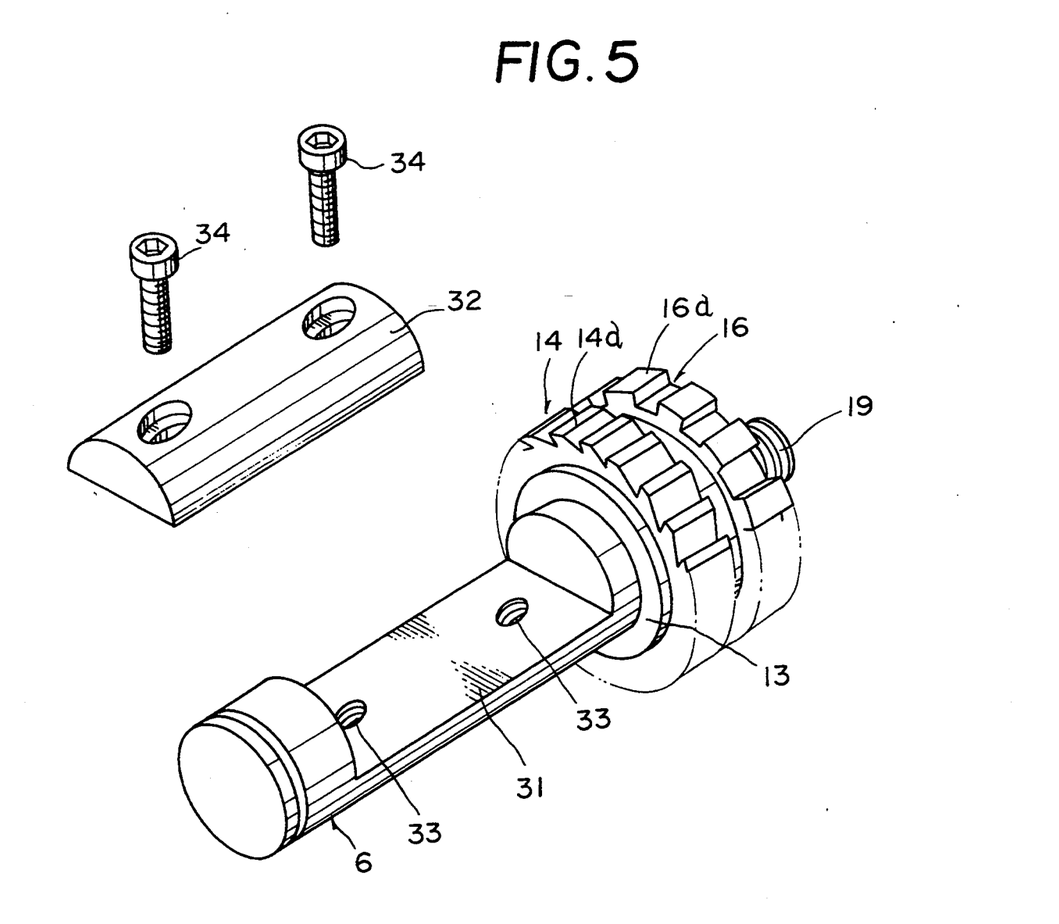
FIG. 5 is a perspective exploded view of the windup shaft.

At first, the fixing construction of the first belt 5 to the windup shaft 6 is that the windup shaft 6, as shown in FIGS. 2 and 3, forms at an axially intermediate portion and at the portion between the side plates 1a and 1b a cutout 31 to reach the radial center as shown in FIGS. 4 and 5, and a holder 32, which can be fitted into the cutout 31 and has a concentric semicircular outer periphery, is provided, so that the holder 32 is fitted into the cutout 31 and set screws 34 are screwed with the threaded bores 33, whereby the first belt 5, as shown in FIG. 4, is fixedly sandwiched between the cutout 31 and the holder 32.

In other words, the first belt 5 is provided at the free end thereof with a hook to be secured to, for example, an engaging portion provided at the load-carrying platform, and at the base side with insertion bores 36 for the set screws 34 and spaced at a predetermined lengthwise interval, the base side of the first belt 5, as shown in FIG. 4, is wound up onto the windup shaft 6 through the cutout 31, the insertion bores 36 are aligned, the holder 32 is fitted into the cutout 31, and the setscrews are inserted into the threaded bores 33 through the insertion bores 36 respectively, whereby the holder 32 is fixed to the windup shaft 6 and the first belt 5 is fixed thereto.

Next, explanation will be given on the belt length adjusting mechanism 8.

The adjusting mechanism 8 comprises the fixed rod 2 provided at the other lengthwise side of the main body 1 and a wind-in member 9 provided inside the fixed shaft 2, in other words, at a side of the windup shaft 6 and for winding in the second belt 7 at the basic end side thereof.

In detail, the second belt 7 is provided at the utmost end thereof with a hook 37 which is the same as the first belt 5 in FIG. 1, and the basis end side of the second belt 7 is wound half way thereof in the wind-in member 9, so that a length of the second belt 7 is adjustable to be fixed at the adjusted position. In the embodiment shown in FIGS. 1 through 3, the wind-in member 9 is provided so as to be not rotatable but slidable back and forth lengthwise of the main body 1.

The wind-in member 9 has at a lengthwise intermediate portion thereof a round peripheral surface for winding-in thereon the second belt 7, and is mounted with respect to the fixed rod 2 so that, as shown in FIG. 1, the radial center of the peripheral surface is positioned widthwise upwardly of the main body 1. At both the lengthwise ends of the wind-in member 9 are provided bosses 9a each not-circular and cutout at both radial sides, at the side plates 1a and 1b are provided slit-like slide bores 38 for receiving therein the bosses 9a respectively, and the wind-in member 9 is supported to the main body 1 so as to be not rotatable but slidable back and forth in a range of each slide bore 38.

The second belt 7 is guided at a load side portion 7b of the basic end portion, as shown in FIG. 1, from below the fixed rod 2 and wind-in member 9 to be wound onto the peripheral surface of the wind-in member 9 and then passes between the wind-in member 9 and the fixed rod 2 and is drawn out from below the fixed shaft 2. When the load side of the second belt 7 is subjected to a tensile force, the wind-in member 9 slides forwardly (leftwardly in FIG. 1), whereby the second belt 7 interposed between the wind-in member 9 and the fixed rod 2 is fixedly sandwiched therebetween. Also, the wind-in member 9 is manually slid away from the fixed rod 2, in other words, rearwardly, rightwardly in FIG. 1 and held at the sliding position, whereby an interval between the wind-in member 9 and the fixed rod 2 is widened, and the free end 7a or the load side 7b provided with a hook 37 is pulled to enable a length of the second belt 7 at the load side to be adjusted.

In addition, the wind-in member 9 can be slidably operated by holding the bosses 9a by operator's hands, and as shown in FIGS. 2 and 3, operating portions 9b for slidably operating the wind-in member 9 are provided at both lengthwise ends (or may be at one lengthwise end) so as to facilitate the slidable operation.

Next, explanation will be given on operation of the belt tightening device constructed as the above-mentioned.

At first, when in use, the hook 35 of the first belt 5 and that 37 of the second belt 7 are caught by, for example, retaining members or eyes at a load-carrying platform of a truck loading cargoes.

In this case, the second belt 7 is taken out at the load side portion 7b, in other words, at the hook 37 side, to elongate the entire belt and to stretch the belt across the cargoes and then the hook 37 is caught by the eyes. After being caught by the eye, the free end 7a of the second belt 7 is pulled in the state where the wind-in member 9 is slid rearwardly by hand, the load side portion 7b is adjusted in length, and the slack belts 5 and 7 are stretched to a predetermined extent, at which time the load side 7b of the second belt 7 is scarcely affected by the load until the belt is stretched to a predetermined extent, whereby the length is adjusted with ease by pulling the free end 7a of the second belt 7.

After the second belt 7 is stretched to the predetermined extent, the wind-in member 9 is released from sliding operation, thereby moving toward the fixed rod 2 to fix the second belt 7. Thereafter, the operating lever 10 is repeated to swing in reciprocation between the forward moving position shown by the solid line in FIG. 1 and the backward moving position counterclockwise to the forward moving position, so that the power by the operating lever 10 is transmitted from the transmitting pawl 25 to the driving member 16 and the driving member 16, ratchet wheel 14 and driven disc 13 are integrated to normally rotate the windup shaft 6 and the windup shaft 6 winds-up thereon the first belt 5 and adjusts length thereof to tighten the cargoes.

In other words, during the baggage tightening, the feed pawl 25a of the transmitting pawl 25 is rotated from the neutral position to engage with the gear portion 16a shown in FIG. 1, whereby the operating lever 10 swings clockwise in FIG. 1 so that the driving member 16 is driven clockwise. Hence, the driving member 16 forwardly screws toward the driven disc 13 and the driving member 16, ratchet wheel 14, and driven disc 13 are integrated, whereby the power transmitted to the driving member 16 is transmitted to the windup shaft 6 through the driven disc 13 and the windup shaft 6 is normally (clockwise in FIG. 1) rotated so as to wind up the first belt 5 and to stretch the first belt 5 for tightening the cargoes.

When the baggages are tightened as the abovementioned, the basic end of the first belt 5 is fixed to the windup shaft 6, the belt length adjusting mechanism adjusts a length of the second belt 7 to stretch the belts 5 and 7 to the predetermined extent, and the windup shaft 6 winds up the first belt 5 by operation of the windup shaft 6, whereby the amount of winding up of the first belt 5 by the windup shaft 6 can be reduced, and the first belt 5 is fixed at the basic end and is adapted to wind up the first belt 5 in one layer, whereby an increase in the windup radius with respect to the amount of winding-up can be restricted. Accordingly, the windup shaft 6 can satisfactorily wind up the first belt 5 and the cargo tightening can be secured.

Also, in order to release the above-mentioned state of performing cargo tightening, the return pawl 25b at the transmitting pawl 25 engages with the gear portion 16a and the operating lever 10 repeats its back and forth swinging motion.

Since the operating lever 10 swings counterclockwise in rig. 1, the driving member 16 is counterclockwise rotatably driven, and backwardly screws in the direction of moving away from the driven disc 13, so that the driving member 16, ratchet wheel 14, and driven disc 13 are released from integration. As the result, the windup shaft 6 reversely rotates only to an extent of rewindingup, and the first belt 5 wound-in the windup shaft 6 is pulled out and the belts 5 and 7 are loosened.

Accordingly, such operation is repeated to result in release of cargo tightening, which release is slowly carried out by operation of the mechanical brake 11 corresponding to the operation of lever 10, so that the belts 5 and 7 are instantaneously released from tightening to prevent the occurrence of upset of cargo. At the rear of the anti-reverse-rotation pawl 3 is provided a control 3a, operation of which disengages the anti-reverse-rotation pawl 3 from the ratchet wheel 14, whereby the windup shaft 6 is freely rotatable regardless of the operation of mechanical brake 11 and the baggage tightening can rapidly be released.

When the cargo tightening is released as the abovementioned and even when the first belt 5 is rewound more than the windup amount thereof, the first belt 5 is fixed to the windup shaft 6. Also, since the second belt 7 is fixed by the belt length adjusting mechanism 8 in the state where the belt 5 is affected by the load, there is no fear that the adjusting side belt to be wound onto the windup shaft escapes from the slit at the windup shaft 6 as in the conventional example. Accordingly, even when upset of cargo occurs at this stage, a further upset of cargo can be prevented, and trouble such that the belt having escaped from the slit and again inserted therein can be eliminated.

In addition, in the above-mentioned embodiment, the example of usage that the first and second belts 5 and 7 are pulled on the same plane at both sides of the main body 1 is explained, but, in some case, as shown in FIG. 6, the main body 1 may be placed at the corner of a cargo 40 to be tightened and the load side portion 7b of the second belt 7 may be pulled vertically downwardly along the side wall of the cargo 40.

Accordingly, in this case, since the load side portion 7b of the second belt 7 is pulled vertically downwardly as shown by the one-dot chain line in FIG. 6, the wind-in member 9 cannot be attracted toward the fixed rod 2 so that the second belt 7 may not be fixed at its adjusting position. However, as shown in FIGS. 1 through 3, a wind-in compensation pin 41, which engages with the load side portion 7b of the second belt 7 wound into the wind-in member 9 and forwardly guides the load side portion 7b so as to compensate a wind-in amount of the second belt 7, is provided widthwise downwardly of the main body 1 with respect to the fixed rod 2, that is, in front of and below the wind-in member 9, so that, even when the second belt 7 is pulled vertically for use, in other words, perpendicularly to the first belt 5, the second belt 7 can be fixedly sandwiched between the wind-in member 9 and the fixed rod 2.

In the above-mentioned embodiment, the second belt 7, as shown in FIG. 1, is guided at the free end 7a from below the fixed rod 2 and wind-in member 9 and wound therein and pulled out from below the fixed rod 2 after passing between the wind-in member 9 and the fixed rod 2. Besides this, for example, the free end 7a may be guided from above the fixed rod 2 and wind-in member 9 in FIG. 1 and transported between the wind-in member 9 and the fixed rod 2, and thereafter the belt 7 winds up the fixed rod 2 and passes between the fixed rod 2 and the wind-in compensation pin 41 and winds up the pin 41, so that the free end portion 7a may be taken out from below the wind-in compensation pin 41. Also, the free end portion 7a may be guided from below the wind-in compensation pin 41 in FIG. 1, wound therein, passed between the wind-in compensation pin 41 and the fixed rod 2, wound in the fixed rod 2, passed between the fixed rod 2 and the wind-in member 9, wound therein, passed above the wind-in member 9 and fixed rod 2, again wound therein, passed between the fixed rod 2 and the wind-in compensation pin 41, wound therein, and then pulled out from below the wind-in compensation pin 41. Thus, the second belt 7 is not especially restricted on mounting thereof.

Also, in the above-mentioned embodiment, the belt tightening device is provided at one axial side of the windup shaft 6 with the mechanical brake 11. Besides this, as shown in FIG. 7, the mechanical brakes 11 may be provided at both axial ends of the windup shaft 6.

Figure 7:
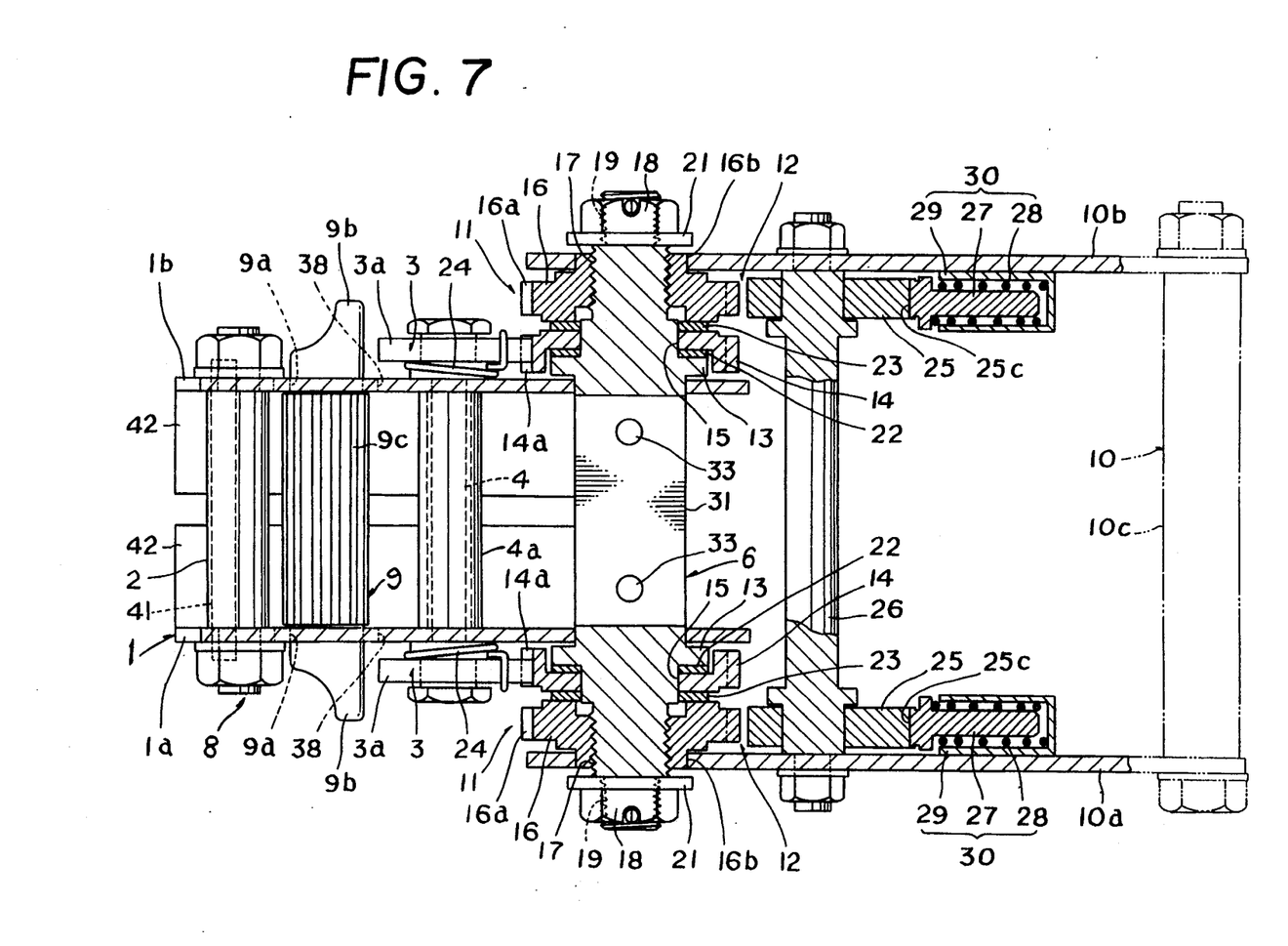
FIG. 7 is an enlarged cross-sectional plan view of a modified embodiment of the present invention corresponding to FIG. 3.

An embodiment shown in FIG. 7 is so constructed that at both axial end of the projecting shaft portion the windup shaft 6 projecting outwardly from the side plates 1a and 1b are provided the driven discs 13, support portions 15, threaded shaft portions 17 one side of which is a right-hand screw and the other side of which is a left-hand screw, and smaller diameter threaded portions 19, the braking ratchet wheels 14 are rotatably supported on the support portions 15 respectively, the driving members 16 are screwably mounted onto the threaded shaft portions 17 respectively, the arms 10a and 10b of the operating lever 10 are rotatably supported to the bosses 16b of the driving members 16 respectively, at both axial ends of the connecting shaft 4 coupled with the main body 1 are provided. The anti-reverse-rotation pawls 3 are engageable with the ratchet wheels 14 to prevent the ratchet wheels 14 from reversely rotating, and at the arms 10a and 10b of the operating lever 10 are swingably provided the transmitting pawls 25 through the pivot shaft 26 respectively, so that the power caused by the swinging operation of operating lever 10 is transmitted to the windup shaft 6 from both the axial ends thereof through the transmitting pawls 25, driving members 16, ratchet wheels 14 and driven discs 13. In addition, the parts in common are designated by the same reference numerals as those in FIGS. 1 through 3.

This embodiment can transmit the power caused by swinging operation of the operating lever 10 gripping the grip 10c to the mechanical brake 11 at one axial end and to the same at the other axial end of the windup shaft 6 from the grip 16c through the arms 10a and 1b, drive the windup shaft 6 through the mechanical brakes 11, and windup the first belt 5 onto the windup shaft 6, whereby the same effect as the embodiment in FIGS. 1 through 3 can be expected, and also when the operating lever 10 is swung for tightening the cargoes, the power caused by swinging operation of the operating lever 10 can be transmitted to the windup shaft 6 from both the axial ends thereof. Accordingly, even when the load to be tightened is larger, the belt tightening therefor can be carried out without deforming the arms 10a and 10b at the operating lever 10. Hence, there is no need of especially improving the rigidity of operating lever 10.

Figure 8:
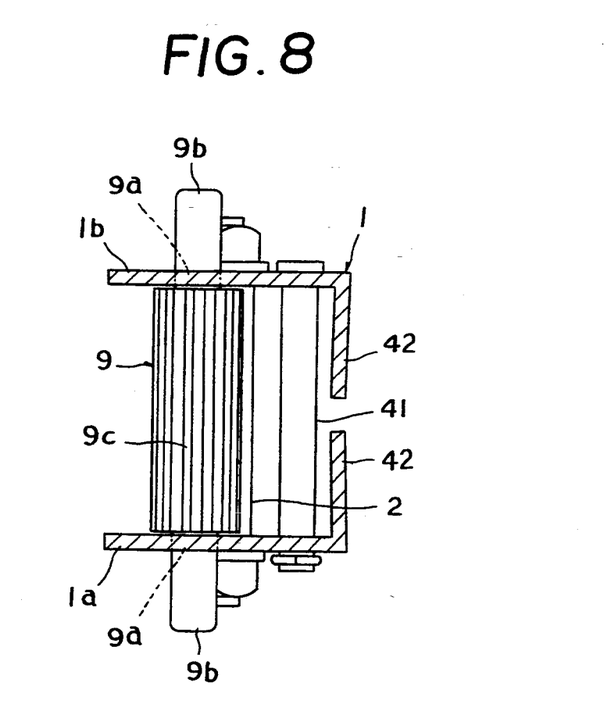
FIG. 8 is a longitudinally sectional view of a wind-in member and a fixed rod in FIG. 7.

In addition, at the outer periphery of the wind-in member 9 between the side plates 1a and 1b are provided a large number of ridges extending axially of the member 9 as shown in FIG. 7 or anti-skid projections 9c or serrations (not shown), so that the second belt 7, when fixedly sandwiched, is preferable to be difficult to slide with respect to the wind-in member 9. Also, it is preferable that, as shown in FIG. 8, at the side plates 1a and 1b are provided bent arms 42 projecting inwardly from the widthwise lower ends of the side plates 1a and 1b so that, when the cargoes are belt-tightened, the bent arms 42 contact with them. Thus, the rigidity of the side plates 1a and 1b can be improved and moreover, when the cargoes are tightened, the edges of the side plates 1a and 1b can contact with the bent arms 42 without contacting with the cargo, thereby effectively preventing the baggages from being flawed by the main body 1, the bent arms 42 being provided so as to upwardly shift at the utmost ends with respect to the planes perpendicular to the side plates 1a and 1b respectively.

In the embodiment shown in FIGS. 1 through 6, the fixing means for fixing the first belt 5 to the windup shaft 6 is provided at the basic end side of the first belt 5 with a pair of insertion bores 36 lengthwise spaced from each other at the predetermined interval, the basic end of the belt 5 winds the windup shaft 6 from the cutout 31 to align the insertion bores 36, and the setscrews 34 are inserted from the insertion bores 36 into the threaded bores 33, thereby fixedly sandwiching the basic end of the first belt 5 between the cutout 31 and the holder 32. Other than this, fixing construction as shown in FIGS. 9 through 11 may be used to fix the first belt 5 to the windup shaft 6.

Figure 9:
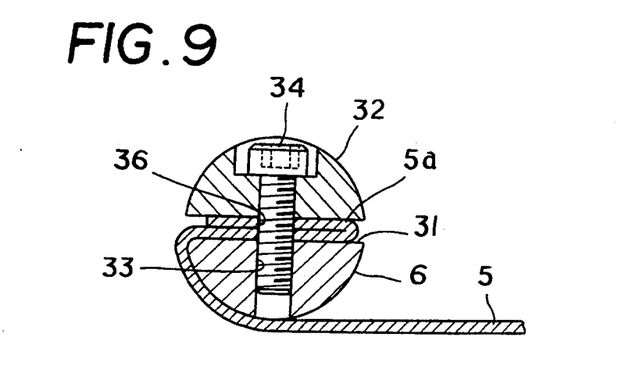
FIG. 9 is a longitudinally sectional view of a modified fixing means for a first belt fixed to the windup shaft.

In detail, in the embodiment shown in FIG. 9, the windup shaft 6 is provided with the cutout 31 which is the same as that shown in FIG. 4, the basic end portion of the first belt 5 of synthetic resin is folded, the folded portion 5a is molded to be integral, at the folded portion 5a are provided the insertion bores 36, the folded portion 5a and holder 32 are fitted into the cutout 31, and each setscrew 34 screws with the threaded bore 33, thereby fixedly sandwiching the first belt 5 between the cutout 31 and the holder 32.

Such construction can improve the rigidity of the first belt 5 at the fixed position thereof and also, when the first belt 5 is fixed to the windup shaft 6, the setscrews 34 can be inserted into the insertion bores 36 without aligning the bores 36, thereby facilitating the fixing work of the first belt 5 to the windup shaft 6.

Figure 10:
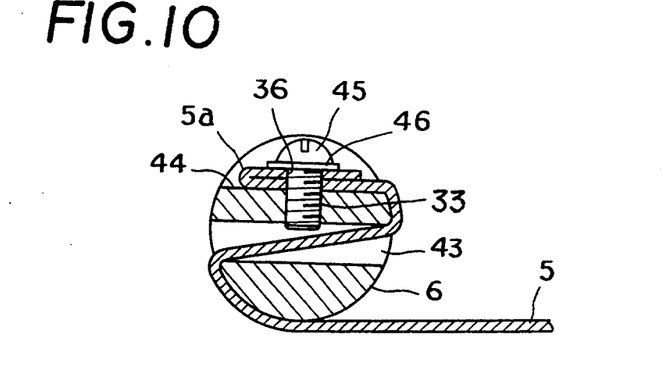
FIG. 10 is a longitudinally sectional view of a another modified fixing means for the first belt fixed to the windup shaft.
Figure 11:
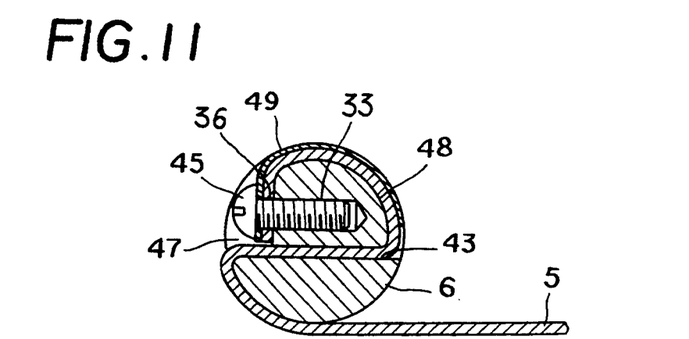
FIG. 11 is a longitudinally sectional view a further modified fixing means for the first belt fixed to the windup shaft.

In FIG. 10, at the portion of the windup shaft 6 positioned between the side plates 1a and 1b are provided a slit 43 radially perforating the shaft 6, a cutout 44 recessed radially inwardly toward the slit 43, and threaded bores 33 perforating the windup shaft 6 from the cutout 44 to the slit 43, the basic end portion of the first belt 5 is folded, the folded portion 5a is molded to be integrated, at the folded portion 5a are provided the insertion bores 36 widthwise spaced at a predetermined interval, the basic end of the first belt 5 is inserted into the slit 43, the folded portion 5a is fitted into the cutout 44, and the setscrews 45 screw with the threaded bores 33 through the insertion bores 36, whereby the folded portion 5a can be fixedly sandwiched between the cutout 44 and the holder 46.

The embodiment of FIG. 10 is thus to that in FIG. 9.

The embodiment shown in FIG. 11 is so constructed that, in FIG. 10, at the portion of windup shaft 6 positioned between the side plates 1a and 1b are provided a slit 43 radially perforating the windup shaft 6, a cutout 47 cut from one end of the slit 43 in the perpendicular direction with respect to the slit 43, a recess 48 in a circular arc and extending from the cutout 47 to the other end of the slit 43, threaded bores 33 extending from the cutout 47 in the same direction as the slit 43, a pair of insertion bores 36 are provided at the basic end portion of the first belt 5, the basic end portion thereof is inserted into the slit 43 to be fitted into the recess 48 and cutout 47, a holder 49 of a leaf spring in a circular arc is fitted into the recess 48 and cutout 47, and setscrews 45 screw with the threaded bores 33 through the insertion bores 36 respectively, thereby fixedly sandwiching the first belt 5 between the cutout 47 and the holder 49.

In this embodiment, the holder 49 can increase the rigidity of the fixed portion of the first belt 5 and also as in FIGS. 9 and 10, working of fixing the first belt 5 to the windup shaft 6 can be simplified.

In the embodiment shown in FIGS. 1 through 6, sliding grooves 38 are provided as means for fixing the second belt 7 adjustably of its length, at the side plates 1a and 1b of the main body 1, and at both axial ends of the windup shaft 9 are not-circular bosses 9a so as to make the windup shaft 9 not rotatable but slidable back and forth lengthwise of the main body 1. Besides this, the fixing means may be formed as shown in FIGS. 12 and 13 or 14 and 15.

Figure 12:
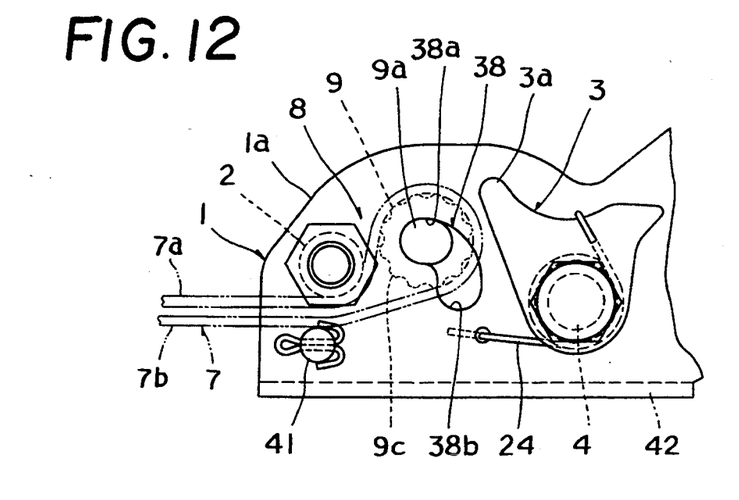
FIG. 12 is a partial side view of a modified belt length adjusting mechanism.
Figure 13:
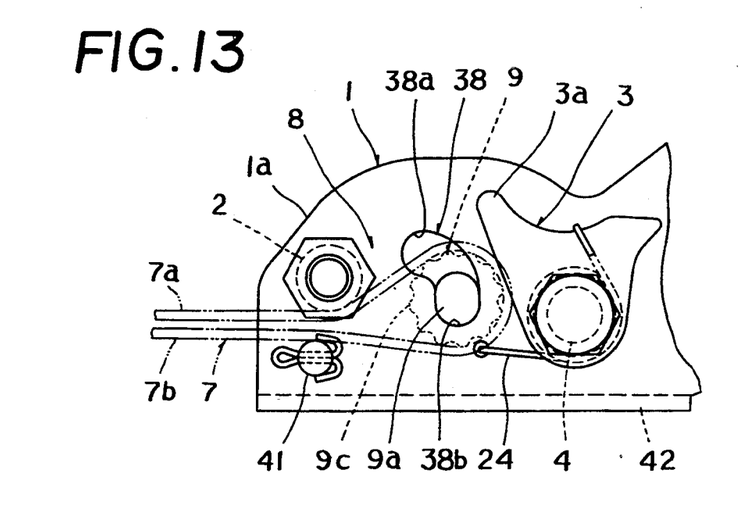
FIG. 13 is a view explanatory of the operation state. in FIG. 12.

In FIGS. 12 and 13, the sliding groove 38 is formed of a first groove 38a positioned in the front longitudinally of the main body 1 so that the second belt 7 is fixedly sandwiched between the fixed rod 2 and the wind-in member 9 inserted into the first groove 38a, and a second groove 38b in continuation of the first groove 38a and extending rearwardly lengthwise of the main body 1 and downwardly and widthwise of the same. In addition, the parts in common to those in FIGS. 1 through 3 are designed like reference numerals.

The sliding grooves 38 each support the non-circular boss 9a of the wind-in member 9 so as to be not rotatable but slidable in a range of the first groove 38a and second groove 38b. When each boss 9a is positioned in the first groove 38a, the second belt 7 is pulled at the load side 7b thereof and fixedly sandwiched between the wind-in member 9 and the fixed rod 2. The boss a is slidably moved from the first groove 38a to the second grove 38b, so that the wind-in member 9, as shown in FIG. 13, moves away from the fixed rod 2 to release the second belt 7 from being fixedly sandwiched, and the boss 9a is held in the second groove 38b so as not to slidably move the wind-in member 9 toward the first groove 38a even when the load side 7b of the second belt 7 is subjected to the tensile force.

In the case of this embodiment as the above-mentioned, each boss 9a is positioned in the first groove 38a so that, when the load side 7b of the second belt 7 is subjected to the tensile force, the wind-in member 9, as shown in FIG. 12, slidably moves toward the fixed rod 2, in other words, forwardly, whereby the second belt 7 interposed between the wind-in member 9 and the fixed rod 2 is fixedly sandwiched therebetween. Also, the wind-in member 9 is slidably moved from the first groove 38a to the second groove 38b, an interval between the wind-in member 9 and fixed rod 2 is enlarged as shown in FIG. 13, so as to enable the second belt 7 to be released from being fixedly sandwiched, and, even when the wind-in member 9 is released from sliding operation or subjected to the tensile force in the releasing state, the open state of the belt 7 can be maintained. Accordingly, the second belt 7 is adjustable in its length without maintaining the sliding state of the wind-in member 9, thereby further facilitating adjustment of length of the same. In addition, the slidable movement of wind-in member 9 as shown in FIG. 12 is performable by pinching the boss 9a by fingers, but it is preferable that, as in FIGS. 1 through 3, an operating portion is provided on at least one axial end of the wind-in member 9.

Figure 14:
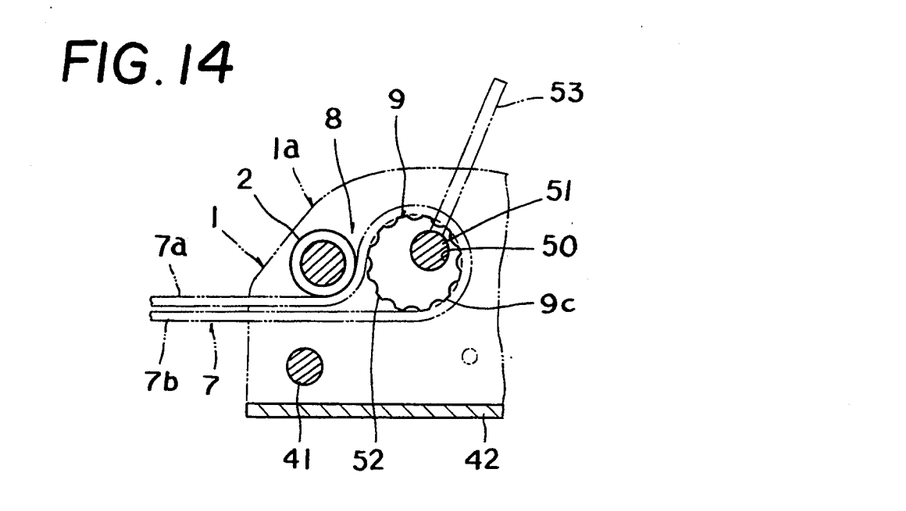
FIG. 14 is a partial side view of another modified belt length adjusting mechanism.
Figure 15:
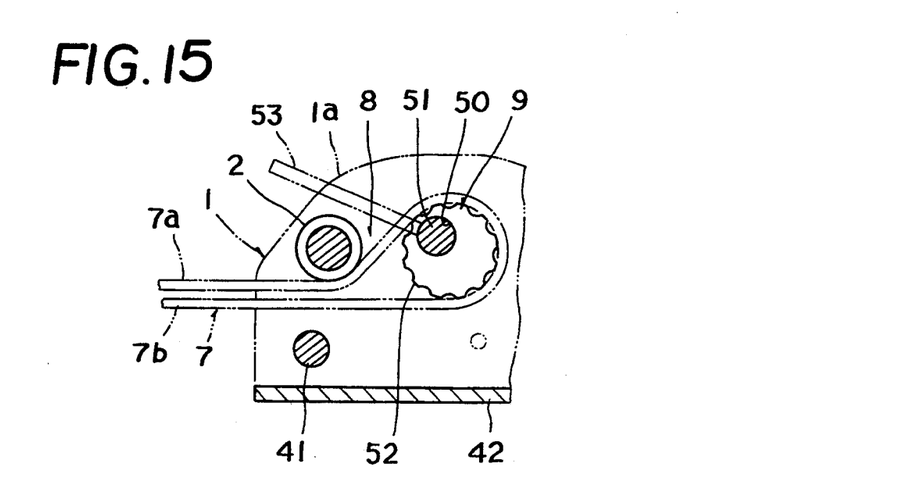
FIG. 15 is a view explanatory of the operation state in FIG. 14.

In an embodiment shown in FIGS. 14 and 15, at the side plates 1a and 1b of the main body 1 are provided round bores 50 instead of the sliding grooves 38 and at both the axial ends of the wind-in member 9 are provided eccentric shaft portions 51. The eccentric shaft portions 51 are rotatably supported into the round bores 50 respectively, and the wind-in member 9 is provided with a cam which, when the load side portion 7b of the second belt 7 is subjected to the tensile force to allow the wind-in member 9 to rotate, fixedly sandwiches the second belt 7 between the wind-in member 9 and the fixed rod 2. In addition, the parts in common to FIGS. 1 through 3 are designates by like reference numerals.

In this embodiment, when the tensile force acts on the load side portion 7b of the second belt 7, the wind-in member 9 rotates clockwise in FIG. 14 around the eccentric shaft portion 50 and a torque acts on the cam 52 so as to more strongly fixedly sandwich between the wind-in member 9 and the fixed rod 2 the second belt 7 interposed therebetween. Also, the wind-in member 9 is rotated counterclockwise in FIG. 14, so that the interval between the wind-in member 9 and the fixed rod 2 is widened, whereby the second belt 7 can be released from the fixedly sandwiching and is easily adjustable in its length. In addition, each eccentric shaft 51 is provided at at least one-side end with a lever-like operating arm 53 as shown in FIG. 14.

In addition, the fixing construction of the first belt 5 shown in FIGS. 9 through 11 and the belt length adjusting mechanism 8 shown in FIGS. 12 through 15 may be used in the cargo tightening device shown in FIG. 7.

The above-mentioned embodiments are applied to the belt tightening device provided with the mechanical brake 11, which is applicable to a belt tightening device not provided with the mechanical brake 11, in which the above-mentioned effect can be expected.

As seen from the above, the belt tightening device of the present invention provided with the main body 1 of the tightening device which is provided at one side with the windup shaft 6 rotatable to wind up thereon the first belt 5, the second belt 7 supported at the other side of the main body 1, and the operating lever 10 supported to the windup shaft 6 and for driving it, wherein the first belt 5 is fixed at the basic end to the windup shaft 6, and at the other side of the main body 1 is provided the belt length adjusting mechanism 8 comprising the wind-in member 9 which winds therein the second belt 7 and has its periphery not rotatable but shiftable back and for the lengthwise of the main body 1 and the fixed rod 2 which is positioned in front of the wind-in member 9 and opposite thereto and fixedly sandwiches the second belt 7 between the fixed rod 2 and the wind-in member 9, whereby the adjustment in length of the second belt 7 can apply a predetermined stretch to the respective belts 5 and 7. Also, an amount of wind-up of the first belt 5 by the operating lever 10 is diminished and an increase in the windup diameter is restricted so as to completely tighten the cargo. Moreover, when the cargo tightening is released, even if the first belt 5 is rewound more than the windup amount, the first belt 5 never escapes from the windup shaft 6, whereby even when an upset of the cargo occurs, further upset does not occur. Also, even when the cargo tightening is released at a stroke, upset of cargo does not occur, and the troublesome work can be avoided if having to insert the belt into the slit.

In the case where the wind-in member 9 is supported to the main body 1 so as to be not rotatable but slidable back and forth lengthwise of the main body 1 so that the second belt 7 is fixedly sandwiched between the wind-in member 9 and the fixed rod 2, when the load side of the second belt 7 is subjected to tensile force, the interval between the wind-in member 9 and the fixed rod 2 can be diminished to fixedly sandwich the second belt 7 therebetween and also the wind-in member 9 can be slidably moved to widen the interval therebetween and release the second belt 7 from being fixedly sandwiched, thereby facilitating adjustment in its length.

Also, in the case where the sliding groove 38 for slidably supporting the wind-in member 9 is constituted of the first groove 38a and second groove 38b, the wind-in member 9 is slid into the first groove 38a so as to diminish the interval between the wind-in member 9 and the fixed rod 2 to fixedly sandwich therebetween the second belt 7, and also the wind-in member is slidably moved from the first groove 38a to the second groove 38b so as to widen the interval between the same to release the second belt 7 from being fixedly sandwiched. Moreover, even when the wind-in member 9 is released from the slidable movement, the release state can be maintained, thereby the second belt 7 can further facilitate the length adjustment by the second belt 7.

In the case where the wind-in member 9 is rotatably supported to the main body 1 and provided with the cam 52, when the load side of the second belt 7 is subjected to the tensile force, the wind-in member 9 can be rotated thereby, so that the interval between the cam 52 and the fixed rod 2 can be narrowed to fixedly sandwich therebetween the second belt 7, thereby enabling the second belt 7 to be further strongly fixed therebetween. The wind-in member 9 is rotated in the reverse direction to the direction of the load, so that the interval between the cam 52 and the fixed rod 2 can be widened to release the second belt 7 from being fixedly sandwiched, thereby enabling the second belt 7 to be adjusted in length with ease.

In the case where the compensation pin 41 is provided frontward and downwardly of the wind-in member 9 so that the load side portion 7b of the second belt 7 is tightened perpendicularly to the first belt 5, in other words, as shown in FIG. 6, even in the case where the main body 1 is positioned on the upper surface of the cargo to be belt-tightened and at the corner thereof and the load side of the second belt 7 is tightened perpendicularly to the first belt 5, the compensation pin 41 can compensate fixedly sandwiching of the second belt 7 between the wind-in member 9 and the fixed rod 2, whereby the second belt 7 can be prevented from being not fixed and versatility of use can be expanded.

Furthermore, in the case where the wind-in member 9 is provided with the operating portion 9b so that the second belt 7 is released from being fixedly sandwiched to adjust a length thereof, the operation is easy to improve workability to that extent.

In the case where at one axial side of the windup shaft 6 is provided the mechanical brake 11 provided with the driven disc 13, braking ratchet wheel 14, driving member 16 and anti-reverse-rotation pawl 3 so that the power caused by operating the operating lever 10 is transmitted to the windup shaft 6 through the mechanical brake 11, when the operating lever 10 is operated to release the cargo tightening, the windup shaft 6 can be rotated while the mechanical brake 11 is operating, whereby the cargo tightening is prevented from being released at a stroke.

In the case where at both the axial sides of the windup shaft 6 are provided the mechanical brakes 11 each provided with the driven disc 13, braking ratchet wheel 14, driving member 16 and anti-reverse-rotation pawl 3 and the operating lever 10 is formed of a pair of arms 10a and 10b and a grip 10c, the cargo tightening can be prevented from being released at a stroke and the power caused by operating the operating lever 10 can be transmitted to the windup shaft 6 from the grip 10c through the arms 10a and 10b and mechanical brakes 11 at both axial ends of the windup shaft 6, whereby even when the tightening load is larger, the cargoes can effectively be tightened without deforming the operating lever 10, whereby there is no need of especially increasing the rigidity of operating arm 10.

Although several embodiments have been described, they are merely exemplary of the invention and not to be constructed as limiting, the invention being defined solely by the appended claims.

What is claimed is:

1. A belt tightening device comprising:
   a) a main body of said belt tightening device,
   b) a first belt having a basic end portion disposed at one lengthwise side of said main body and an utmost end having hook means and a second belt having a basic end portion disposed at the other lengthwise side of said main body and having an utmost end having hook means;
   c) a winding shaft rotatably supported at one lengthwise side of said main body for winding up said first belt and provided with an operating lever for driving said windup shaft;
   d) fixing means for fixing the basic end portion of said first belt to said windup shaft;
   e) a belt length adjusting mechanism having a wind-in member supported by the other lengthwise side of said main body so as to be displaceable back and forth lengthwise of said main body and having the periphery onto which the basic end portion of said second belt is wound halfway thereof, and a fixed rod positioned in front of, and opposed to said wind-in member, and fixedly sandwiching said second belt between said fixed rod and the periphery of said wind-in member;

said belt length adjusting mechanism adjusting a belt length of said second belt, and thereafter said operating lever operating to drive said windup shaft, so that said first belt fixed at the basic end thereof of said windup shaft is wound to tighten cargoes.

2. A belt-tightening device according to claim 1, wherein said wind-in member is supported by said main body so as to be not rotatable but slidable back and forth longitudinally of said main body, so that, when said second belt wound in said wind-in member is subjected to a tensile force, said wind-in member slides forwardly so as to fixedly sandwich said second belt between said wind-in member and said fixed rod.

3. A belt tightening device according to claim 1, wherein said main body is provided with a pair of side plates, said plates being provided with sliding grooves for supporting said wind-in member so as to be not rotatable but slidable back and forth lengthwise of said main body, said sliding grooves each being provided with a first groove which is positioned at the front longitudinally of said main body to allow said wind-in member to slide toward said fixed rod and fixedly sandwiches said second belt between said wind-in member and said fixed rod and a second groove which is in continuation of said first groove and positioned at the rear longitudinally of said main body with respect to said first groove so as to hold said wind-in member at a position where said wind-in member moves away from said fixed rod to release said second belt from being fixedly sandwiched.

4. A belt tightening device according to claim 1, wherein said wind-in member is rotatably supported to said main body, and the belt winding-in portion of said wind-in member is provided with a cam which, when said second belt is subjected to the tensile force to rotate said wind-in member, fixedly sandwiches said second belt between said wind-in member and said fixed rod.

5. A belt tightening device according to claim 1 wherein said main body is provided at the front and downwardly of said wind-in member with a wind-in compensation pin engageable with the load side portion of said second belt wound in said wind-in member in continuation of the fore end of said second belt for compensating an amount of winding of said second belt wound in said wind-in member.

6. A belt tightening device according to claim 1, in which at least one axial end of said wind-in member is provided with an operating portion for operating said wind-in member.

7. A belt tightening device according to claim 1, wherein
 a) at one axial end of said winding shaft there is provided a driven disc, a support portion for a braking ratchet wheel and a threaded shaft portion; and
 b) at said support portion a braking ratchet wheel is rotatably supported, and said threaded shaft portion is screwed into a driving member having a gear portion at an outer periphery thereof, said main body is provided with an anti-reverse-rotation pawl engageable with said ratchet wheel, and said operating lever is provided with a mechanical brake engageable with said gear portion of said driving member and for driving said driving member by operating said operating lever.

8. A belt tightening device according to claim 1, wherein
 a) at both axial ends of said windup shaft there is provided a pair of driven discs, a pair of support portions for supporting braking ratchet wheels, and a pair of threaded shaft portions respectively,
 b) said operating lever is provided with a pair of arms and a grip for connecting said arms,
 c) at said support portions of said windup shafts are supported said braking ratchet wheels, with said threaded shaft portions being screwed into said driving members having at the outer periphery thereof gear portions, at said main body are supported a pair of anti-reverse-rotation pawls engageable with said ratchet wheels, and at said arms of said operating lever are provided mechanical brakes engageable with said gear portions of said driving members and provided with transmitting pawls for driving said driving members by operating said operating lever.

* * * * *